United States Patent
Jung et al.

(10) Patent No.: US 10,391,601 B2
(45) Date of Patent: Aug. 27, 2019

(54) POSITION MEASURING DEVICE FOR USE ON A MACHINE TOOL

(71) Applicant: DECKEL MAHO Pfronten GmbH, Pfronten (DE)

(72) Inventors: Robert Jung, Pfronten (DE); Roland Koechl, Vils (AT)

(73) Assignee: DECKEL MAHO Pfronten GmbH, Pfronten (DE)

( * ) Notice: Subject to any disclaimer, the term of this patent is extended or adjusted under 35 U.S.C. 154(b) by 164 days.

(21) Appl. No.: 15/511,207

(22) PCT Filed: Sep. 15, 2015

(86) PCT No.: PCT/EP2015/071008
§ 371 (c)(1),
(2) Date: Mar. 14, 2017

(87) PCT Pub. No.: WO2016/041919
PCT Pub. Date: Mar. 24, 2016

(65) Prior Publication Data
US 2017/0252885 A1  Sep. 7, 2017

(30) Foreign Application Priority Data

Sep. 15, 2014 (DE) .......................... 10 2014 218 483

(51) Int. Cl.
*G01D 5/347* (2006.01)
*B23Q 17/22* (2006.01)
(Continued)

(52) U.S. Cl.
CPC .......... *B23Q 17/22* (2013.01); *B23Q 11/0003* (2013.01); *G01D 5/02* (2013.01);
(Continued)

(58) Field of Classification Search
CPC ....................... G01D 5/34746; G01D 5/34753
(Continued)

(56) References Cited

U.S. PATENT DOCUMENTS 4,569,137 A * 2/1986 Ichikawa ........... G01D 5/34707
33/706
4,593,471 A 6/1986 Nelle
(Continued)

FOREIGN PATENT DOCUMENTS

CH  592 498 A5  10/1977
CN  1526065 A  9/2004
(Continued)

OTHER PUBLICATIONS

German Office Action, dated Apr. 10, 2015, for German Application No. 10 2014 218 483.5, 5 pages (with partial English translation).
(Continued)

*Primary Examiner* — George B Bennett
(74) *Attorney, Agent, or Firm* — Seed Intellectual Property Law Group LLP

(57) ABSTRACT

A position measuring device for use on a machine tool includes a scale section that can be scanned by way of a scanner device and serves to detect a position of a first component of the machine tool in relation to a second component of the machine tool, which is movable in relation to the first component, when the scale section is arranged on the first component and the scanner device is arranged on the second component, and at least one holding element as a constituent of an indirect attachment for indirectly attaching the scale section to the first component of the machine tool. A material of the at least one holding element has a thermal expansion coefficient that is less than a thermal expansion coefficient of a material of the first component of the machine tool.

20 Claims, 11 Drawing Sheets

(51) Int. Cl.
*B23Q 11/00* (2006.01)
*G01D 5/244* (2006.01)
*G01D 5/02* (2006.01)
*G01D 5/26* (2006.01)
*G01B 5/00* (2006.01)

(52) U.S. Cl.
CPC ......... *G01D 5/244* (2013.01); *G01D 5/24442* (2013.01); *G01D 5/26* (2013.01); *G01B 5/0014* (2013.01)

(58) Field of Classification Search
USPC .......................................... 33/706, 707, 708
See application file for complete search history.

(56) References Cited

U.S. PATENT DOCUMENTS

| | | | |
|---|---|---|---|
| 4,831,737 A | 5/1989 | Grund | |
| 5,065,525 A | 11/1991 | Szenger | |
| 5,182,867 A * | 2/1993 | Nelle | G01B 5/0014 33/702 |
| 5,760,392 A | 6/1998 | Hisamoto et al. | |
| 6,571,486 B1 * | 6/2003 | Tondorf | G01D 5/34707 33/706 |
| 2002/0066201 A1 * | 6/2002 | Boge | F16C 41/007 33/706 |
| 2004/0211078 A1 * | 10/2004 | Kodama | G01B 5/0014 33/706 |
| 2006/0016089 A1 * | 1/2006 | Kawada | G01B 3/004 33/706 |
| 2010/0242295 A1 * | 9/2010 | Tomiya | G01D 5/34707 33/700 |
| 2014/0222372 A1 * | 8/2014 | Sprenger | G01B 5/008 702/155 |
| 2016/0146641 A1 * | 5/2016 | Bauer | G01D 5/34715 33/706 |
| 2016/0178362 A1 * | 6/2016 | Iseli | G01B 5/008 33/503 |

FOREIGN PATENT DOCUMENTS

| | | |
|---|---|---|
| CN | 1675520 A | 9/2005 |
| CN | 101288937 A | 10/2008 |
| CN | 101714499 A | 5/2010 |
| DE | 36 27 546 C1 | 11/1987 |
| DE | 10 2006 031 756 A1 | 1/2008 |
| DE | 10 2008 051 878 A1 | 4/2010 |
| EP | 0 118 607 A2 | 9/1984 |
| EP | 0 416 391 A2 | 3/1991 |
| EP | 2 233 893 A2 | 9/2010 |
| JP | S59-157510 A | 9/1984 |
| JP | H03-99213 A | 4/1991 |
| JP | H06-644 U | 1/1994 |
| JP | 2000-097686 A | 4/2000 |
| WO | 02/27265 A2 | 4/2002 |

OTHER PUBLICATIONS

German Search Report, dated Apr. 10, 2015, for German Application No. 10 2014 218 483.5, 4 pages (with partial English translation).
International Search Report, dated Dec. 11, 2015, for International Application No. PCT/EP2015/071008, 3 pages.
JP Office Action for JP Application No. 2017-514497, dated Aug. 1, 2018, 12 pages.
Chinese Office Action and Search Report of the China National Intellectual Property Administration, dated Jul. 30, 2018, for Chinese Application No. 201580049472.9, 9 pages (with partial English Translation).

* cited by examiner

POSITION MEASURING DEVICE FOR USE ON A MACHINE TOOL

BACKGROUND

Technical Field

The present disclosure relates to a position and/or length measuring device for use on a machine tool, in particular for the incremental or preferably absolute measurement of a position of a first component in relation to a second component, e.g., in the case of machine tool components which can travel in relation to one another by means of a numerically controllable linear axis. In particular, the present disclosure relates to an attachment device for attaching a position and/or length measuring device for use on a machine tool.

Description of the Related Art

Machine tools, in particular numerically controlled machine tools, are known to provide components which can linearly travel by means of a numerically controllable linear axis which comprises a drive in relation to another component of the machine tool. Here, positions which are to be approached via the linear axis, e.g., via inputs of an operator of a control panel of the machine tool or via travel commands of a control program, are predetermined as target positions which are converted into control commands to be conveyed to the drive of the linear axis in order to move a first component of the machine tool, such as a linear axis slide, in relation to a second component, such as a component carrying guideways for the slide, by means of the control commands.

In order to improve the accuracy of the position control, it is intended to provide machine tools with a position and/or length measuring device which allows to measure in relation to one another a current actual position of the components which can travel in relation to one another, e.g., to calibrate the position control of the linear axis or also to directly measure a position of the components in relation to one another, if required, e.g., after switching on the machine tool and/or the control of the machine tool.

On the one hand, it is possible to detect the position of two components which can travel in relation to one another in incremental fashion via the and/or on the drive of the linear axis. However, the prior art proposes and/or uses position measuring devices for the incremental but also preferably for the absolute position measurement and/or for determining the position of two machine tool components which can travel in relation to one another, said position measuring devices comprising a scale section and/or a scale code section which is attached to and/or mounted on one of the components and a scanner device which is attached to the other component and travels with the component in relation to the component having the scale section and/or the scale code section. When the scale section and/or the scale code section is scanned by the scanner device, the position of the components can be determined in relation to one another; see, e.g., a generic position measuring device according to DE 10 2006 031 756 A1.

It is possible to calibrate and monitor the machine control by comparing the actual position determined by way of the position measuring device and the target position predetermined in the control. As a result, the processing accuracy can be significantly improved when workpieces are processed on the machine tool. However, due to today's demands on the processing accuracy, it is always an objective to further improve the processing accuracy and calibration possibilities on the machine tool.

BRIEF SUMMARY

The present disclosure provides a position and/or length measuring device for use on a machine tool, which renders possible to further improve the processing accuracy and the calibration possibilities on the machine tool, in particular by way of measures that are as simple, reliable and cost-effective as possible.

For example, a position measuring device for use on a machine tool according to claim 1 is proposed according to the present disclosure. Dependent claims and further aspects described in the below passages relate to preferred embodiments of the present disclosure.

A first aspect of the present disclosure proposes a position measuring device for use on a machine tool. The position measuring device comprises a scale section which can be scanned by way of a scanner device (e.g., by optical, electronic, magnetic, mechanical or opto-electronic scanning) in order to detect a position of a first component of the machine tool in relation to a second machine tool component which can move and/or travel in relation to the first component, in particular when the scale section is arranged on the first component and/or the scanner device is arranged on the second component.

According to this aspect, the position measuring device also comprises at least one holding element as a constituent of an indirect attachment in order to indirectly attach the scale section to the first component of the machine tool, a material of the at least one holding element having a thermal expansion coefficient which is less than a thermal expansion coefficient of a material of the first component of the machine tool.

An underlying concept of the disclosure is here in particular that it is an advantage to arrange or even mount the scale section on the first component of the machine tool, however, not to attach it directly and/or in directly stationary fashion to the first component of the machine tool but rather indirectly via at least one holding element having a thermal expansion coefficient which is less than a thermal expansion coefficient of a material of the first component of the machine tool.

As a result of such measures, a configuration is advantageously provided where a possible thermal deformation and/or thermal expansion of the first component of the machine tool does not have a direct influence on the form, position and/or orientation of the scale section since the deforming and/or expanding first component moves and/or can be moved away "below" the scale section and/or can expand or deform below the scale section. Therefore, the position measurement by the position measuring device can be carried out accurately in spite of a possible thermal deformation and/or expansion of the first component without significant temperature influences, and in particular on avoiding temperature-related measurement errors.

On account of the small expansion coefficient of the material of the at least one holding element, via which the scale section can be indirectly attached to the first component, the absolute position of the scale section remains stationary and independent of the temperature, virtually irrespectively of a possible thermal deformation and/or expansion of the first component of the machine tool since the thermal deformation and/or expansion of the first component has no effect due to the lack of direct stationary attachment of the scale section to the first component and the at least one holding element has no, and/or an at least significantly smaller, thermal deformation and/or expansion.

In some embodiments of the disclosure, it is thus advantageous to render possible a virtually temperature-related, accurate position measurement which allows by simple means a compensation of the temperature-related deformations and/or expansions of the components of the machine tool. As a result, it is possible by simple means and in cost-effective manner to improve the processing accuracy of the machine tool without having to provide in obligatory fashion additional temperature sensor-based corrections in the control.

In preferred embodiments, the material of the holding element preferably has at least in the direction of the scale a thermal expansion coefficient which is preferably less than the thermal expansion coefficient of the material of the first component of the machine tool.

In preferred embodiments, the material of the holding element has a thermal expansion coefficient which is preferably less than or equal to $3.0 \cdot 10^{-6}$ K$^{-1}$, in particular less than or equal to $1.0 \cdot 10^{-6}$ K$^{-1}$.

In preferred embodiments, the holding element is preferably made of a fiber-reinforced plastic material, more preferably of a carbon fiber-reinforced plastic material. For example, a light, stable and rigid holding element having a very low thermal expansion coefficient can be provided by simple means.

In preferred embodiments, the holding element is preferably made of quartz glass. For example, a light, stable and rigid holding element having a very low thermal expansion coefficient can be provided by simple means.

In preferred embodiments, the scale section can preferably be indirectly attached via only a single fixed point section which can be mounted on the first component. An advantage is that an influence of the possible thermal deformation and/or expansion of the first component can be further significantly reduced since the scale section can be indirectly attached via only a single fixed point section which can be mounted or is mounted on the first component. As a result, the position of the scale section is substantially absolute and independent of the temperature in relation to the position of the fixed point section, irrespective of how the remaining regions and sections of the first component are thermally deformed and/or expanded.

In preferred embodiments, the scale section is preferably directly or indirectly attached to the at least one holding element, and the holding element can preferably be attached to the first component of the machine tool via only one fixed point section which can be mounted on the first component. An advantage is that an influence of the possible thermal deformation and/or expansion of the first component can further be significantly reduced since the scale section can be indirectly attached via only a single fixed point section which can be mounted or is mounted on the first component. As a result, the position of the scale section is substantially absolute and independent of the temperature in relation to the position of the fixed point section, irrespective of how the remaining regions and sections of the first component can be thermally deformed and/or expanded.

In preferred embodiments, the holding element preferably expands in the direction of the scale of the scale section, and the scale section is preferably attached to the holding element, the holding element being preferably directly attached to the fixed point section which can be mounted on the first component.

In preferred embodiments, the at least one holding element is a rod which extends in the direction of the scale of the scale section and is made of quartz glass or of a fiber-reinforced plastic material, in particular of a carbon fiber-reinforced plastic material. One end of the rod is preferably attached to the fixed point section which can be mounted on the first component and/or the other end of the rod is preferably attached to the scale section via a second fixed point section.

In preferred embodiments, the holding element extends in the direction of the scale of the scale section and the scale section is preferably attached to the holding element, the holding element being preferably indirectly attachable to the first component.

In preferred embodiments, the holding element is preferably attached to a second holding element which is preferably attached to the fixed point section that can be mounted on the first component. An advantage is that it thus possible to obtain a stable design in order to provide a first holding element for holding and stabilizing the scale section and to provide a second holding element for attaching the first holding element and/or the scale section to a fixed point section.

In preferred embodiments, the second holding element extends in the direction of the scale of the scale section and is preferably attached to the scale section and/or the first holding element via only a single fixed point section mounted on the scale section and/or the first holding element.

In preferred embodiments, the second holding element is preferably a rod which extends in the direction of the scale of the scale section and is made of quartz glass or of a fiber-reinforced plastic material, in particular of a carbon fiber-reinforced plastic material, one end of the rod being preferably attached to the fixed point section which can be mounted on the first component and/or the other end of the rod being preferably attached to the first holding element via a second fixed point section.

In preferred embodiments, the scale section and/or the at least one holding element can be mounted on the first component via one or more supporting elements. An advantage is that, in addition to the one indirect stationary attachment via the at least one holding element and one potential single fixed point section which can be mounted on or attached to the first component in stationary fashion, further supporting elements can be provided which can hold and/or support the scale section and/or the holding element at the first component so as to improve and stabilize the arrangement on the first component without providing a further stationary attachment.

For example, supporting elements can hold, support, clamp and/or press the scale section and/or the holding element on the first component, however, without providing a completely firm stationary attachment. An advantage is that a small relative movement of the first component in relation to the scale section and/or the holding element is still possible at the supporting elements, e.g., on the basis of a thermal expansion movement of the first component below/next to the scale section and/or the holding element.

In preferred embodiments, the position measuring device also comprises the scanner device which can be mounted on the second component and is designed to scan the scale section for detecting the position of the first component of the machine tool in relation to the second component of the machine tool that is movable in relation to the first component.

According to a further aspect of the present disclosure, a machine tool is also proposed, comprising a first component, a second component which can travel in relation to the first component, and a position measuring device according to one or more of the above described aspects and embodiments.

A scanner device, e.g., as mentioned above, of the position measuring device is preferably arranged on the second component, and the scale section of the position measuring device is preferably arranged on the first component. According to the disclosure, the scale section is preferably indirectly attached to the first component of the machine tool via the at least one holding element as a constituent of the indirect attachment, a material of the at least one holding element preferably having a thermal expansion coefficient which is less than a thermal expansion coefficient of a material of the first component of the machine tool.

In summary, the present disclosure proposes aspects and embodiments which advantageously render possible to provide a position and/or length measuring device for use on a machine tool and/or a machine tool which can further improve the processing accuracy and the calibration possibilities on the machine tool, in particular by way of simple, reliable and cost-effective measures.

DETAILED DESCRIPTION

Figure 1A:
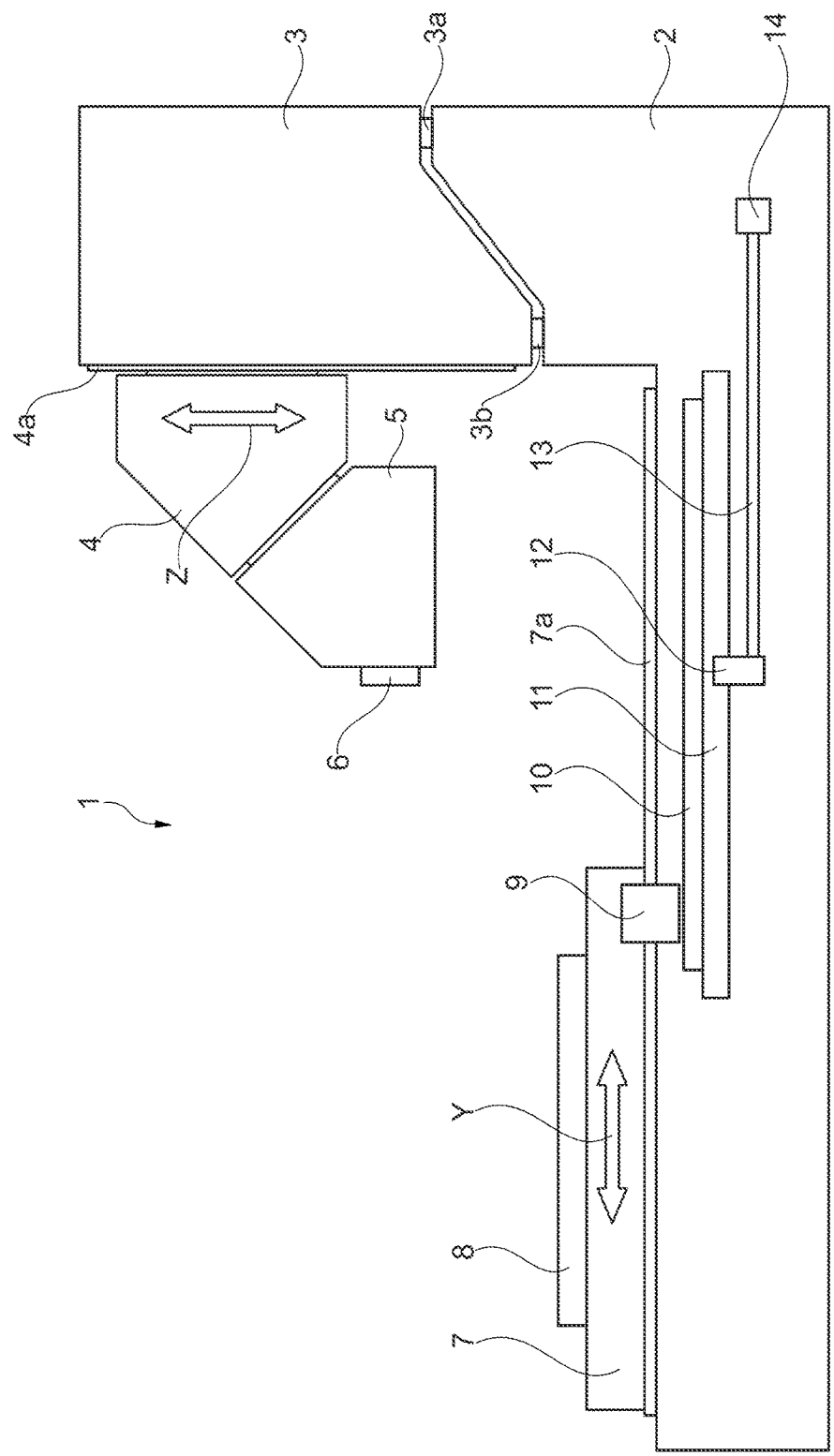
FIGS. 1A and 1B show exemplary schematic diagrams of a machine tool having a position measuring device according to an embodiment.

Examples of the present disclosure are described in detail below with reference to the drawings. Equal or similar elements in the drawings are here designated by equal reference signs. However, the present disclosure is not limited to the described design features but comprises further modifications of features of the described examples and combination of features of various examples within the scope of protection of the independent claims.

Figure 1B:
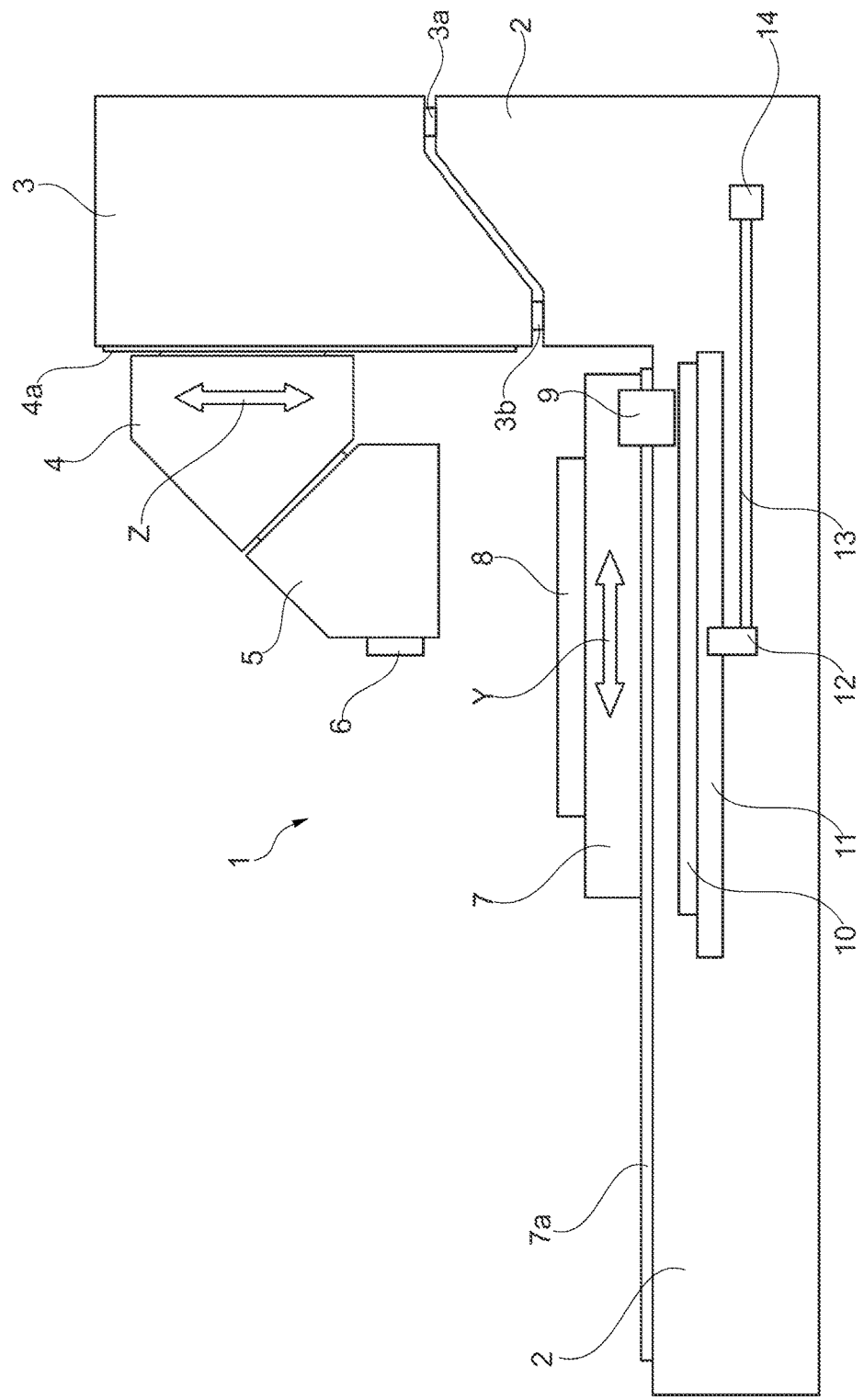

FIGS. 1A and 1B show exemplary schematic diagrams of a machine tool 1 having a position measuring device according to an embodiment. The machine tool 1 (e.g., a numerically controllable 5-axis milling machine and/or, in further embodiments, also optionally a 5-axis machining center and/or a 5-axis machining center or also lathes or milling machines/lathes) has a machine bed 2 which is usually made of steel or cast iron.

One side of the machine bed 2 is provided with horizontal guideways 3a and 3b, on which a machine stand 3 is arranged which can travel on and/or along the guideways 3a and 3b by means of a first exemplary linear axis of the machine tool in a horizontal X-direction that runs, e.g., perpendicularly to the plane of drawing.

One side of the machine stand 3 is provided with vertical guideways 4a where a slide section 4 of a spindle head of the machine tool is arranged and can travel on and/or along the guideways 4a by means of a second exemplary linear axis of the machine tool in a vertical Z-direction.

A spindle carrier section 5 of the spindle head is arranged on the slide section 4 of the spindle head and carries a tool carrying spindle 6 which can accommodate a tool and be rotationally driven to produce a machining movement. In some embodiments, the spindle carrier section 5 of the spindle head can be rotated and/or pivoted in relation to the slide section 4 of the spindle head by way of a rotary and/or pivot axis.

The top side of the machine bed 2 is provided with horizontal guideways 7a, which accommodate an axis slide 7 that can travel on and/or along the guideways 7a by way of a third exemplary linear axis of the machine tool in a horizontal Y-direction. The axis slide 7 is provided, e.g., with a round or rotary table 8 where workpieces and/or workpiece clampings can be mounted or attached. In some embodiments, the round table 8 can be rotated and/or pivoted in relation to the axis slide 7 by way of a rotary axis and/or pivot axis.

The machine tool 1 also has a position measuring device according to an embodiment of the disclosure, comprising a scanner device 9 and a scale section 10.

The scanner device 9 of the position measuring device is mounted on or attached to, e.g., the axis slide 7 in such a way that the scanner device 9 of the position measuring device also moves or travels with the axis slide 7 when the axis slide 7 travels in relation to the machine bed 2 along the guideways 7a in the Y-axis and/or Y-direction. This is shown in FIGS. 1A and 1B, FIG. 1A showing the machine tool 1, e.g., in a state in which the axis slide 7 with the round table 8 and the scanner device 9 of the position measuring device is moved to the left, and FIG. 1B showing the machine tool 1, e.g., in a state in which the axis slide 7 with the round table 8 and the scanner device 9 of the position measuring device is moved to the right.

The scale section 10 is mounted on the machine bed 2 and extends parallel to the Y-direction of the axis slide 7 in such a way that the scanner device 9 of the position measuring device, which is mounted on the axis slide 7, can scan and/or read out an opposite section of the scale section 10 at any position of the axis slide 7.

Here, the position measuring device can be made as an incremental position measuring device where the scanner device 9 cannot read out the absolute position at the scale section 10 but can incrementally detect the distance between two points at the scale section 10 when moving along the scale section 10. However, the position measuring device is preferably made as an absolute position measuring device where the scanner device 9 is designed to read out an absolute position at any position of the scale section 10. The scale section 10 is preferably scanned optically, electronically and/or opto-electronically by the scanner device 9.

However, in further embodiments it is possible to use mechanical or mechanical scanning methods.

An embodiment of the attachment system for the position measuring device is described below. Here, a first holding element 11 is provided and extends parallel to the Y-direction by analogy with the scale section 10 and has a length which is equal to or here, e.g., larger than the length of the scale section 10.

By way of example, the scale section 10 is arranged and mounted on or attached to the first holding element 11. For example, the holding element 11 is made of a material which has a smaller thermal expansion coefficient than the material of the machine bed 2, in particular is less than or equal to $3.0 \cdot 10^{-6}$ K$^{-1}$, more preferably less than or equal to $1.0 \cdot 10^{-6}$ K$^{-1}$. In the case of materials having different expansion coefficients in different directions, the holding element 11 is made of a material which in the direction of the Y-direction and/or in the direction of the scale of the scale section 10 has a smaller thermal expansion coefficient than the material of the machine bed 2.

In some embodiments, the holding element 11 can be made as a holding element from a fiber-reinforced plastic material (more preferably from a carbon fiber-reinforced plastic material), e.g., as an elongate plate from a fiber-reinforced plastic material (more preferably from a carbon fiber-reinforced plastic material). In such embodiments, the holding element 11 has virtually no temperature behavior since the thermal expansion coefficient is virtually vanishingly small.

In the embodiment according to FIGS. 1A and 1B, the scale section 10 is not directly attached to the machine bed 2 but to the holding element 11. Furthermore, the holding element 11 is, e.g., not directly attached to the machine bed 2 but attached to a second holding element 13 via a fixed point section 12 and/or fixed point attachment element 12.

For example, the holding element 13 is made of a material which has a smaller thermal expansion coefficient than the material of the machine bed 2, in particular less than or equal to $3.0 \cdot 10^{-6}$ K$^{-1}$, more preferably less than or equal to $1.0 \cdot 10^{-6}$ K$^{-1}$. In the case of materials having different expansion coefficients in different directions, the holding element 13 is made of a material which has in the direction of the Y-direction and/or in the direction of the scale of the scale section 10 a smaller thermal expansion coefficient than the material of the machine bed 2.

In some embodiments, the holding element 13 can be made as a holding element from a fiber-reinforced plastic material (more preferably from a carbon fiber-reinforced plastic material), e.g., as an elongate holding rod made from a fiber-reinforced plastic material (more preferably from a carbon fiber-reinforced plastic material). In further embodiments, the holding element 13 can preferably be made as a holding element from quartz glass, e.g., as an elongate holding rod made of quartz glass. In such embodiments, the holding element 13 has virtually no temperature behavior since the thermal expansion coefficient is virtually vanishingly small.

One end of the elongate holding element 13, which extends, e.g., in the Y-direction is attached in stationary fashion to the holding element 11 via the fixed point section 12 (attachment element) (e.g., by way of one or more screws and/or grooves and/or by way of adhesive). Here, the fixed point section 12 is attached, e.g., to a central portion of the holding element 11.

The other end of the elongate holding element 13 which extends, e.g., in the Y-direction is attached in stationary fashion to the machine bed 2 of the machine tool 1 via the fixed point section 14 (attachment element) (e.g., by way of one or more screws and/or grooves and/or by way of adhesive).

In this embodiment, the scale section 10 of the position measuring device is indirectly attached to the machine bed 2 by attaching the scale section 10 directly to the holding element 11 in stationary fashion (or mounting it thereon in stationary fashion), attaching the holding element 11 in stationary fashion at its central section via the fixed point section 12 to one end of the holding element 12, and attaching the other end of the holding element 12 in stationary fashion to the machine bed 2 via the fixed point section 14 at the position of the machine stand 3. The fixed point section 14 thus forms, in the attachment system of the scale section 10, the only fixed point of the stationary attachment to the machine bed 2 (thermal fixed point). Therefore, a thermal expansion of the machine bed 2 results in the case of higher ambient temperatures to the fact that the machine bed 2 expands in relation to the attachment system of the scale section 10 and the fixed point section 14 to the left in FIGS. 1A and 1B below the scale section 10, the position of the scale section 10 remaining substantially unchanged in relation to the thermal fixed point at the fixed point section 14.

Therefore, a position measuring device can advantageously be provided where a virtually absolute and temperature-independent measuring rod system is provided which, in spite of and advantageously independently of possible thermal expansions and deformations of the machine bed 2, which is located underneath and/or adjacent thereto, renders possible precise position determinations in such a way that, optionally, further thermal compensation corrections are no longer necessary in the controls, e.g., on the basis of temperature sensor signals.

Figure 2:
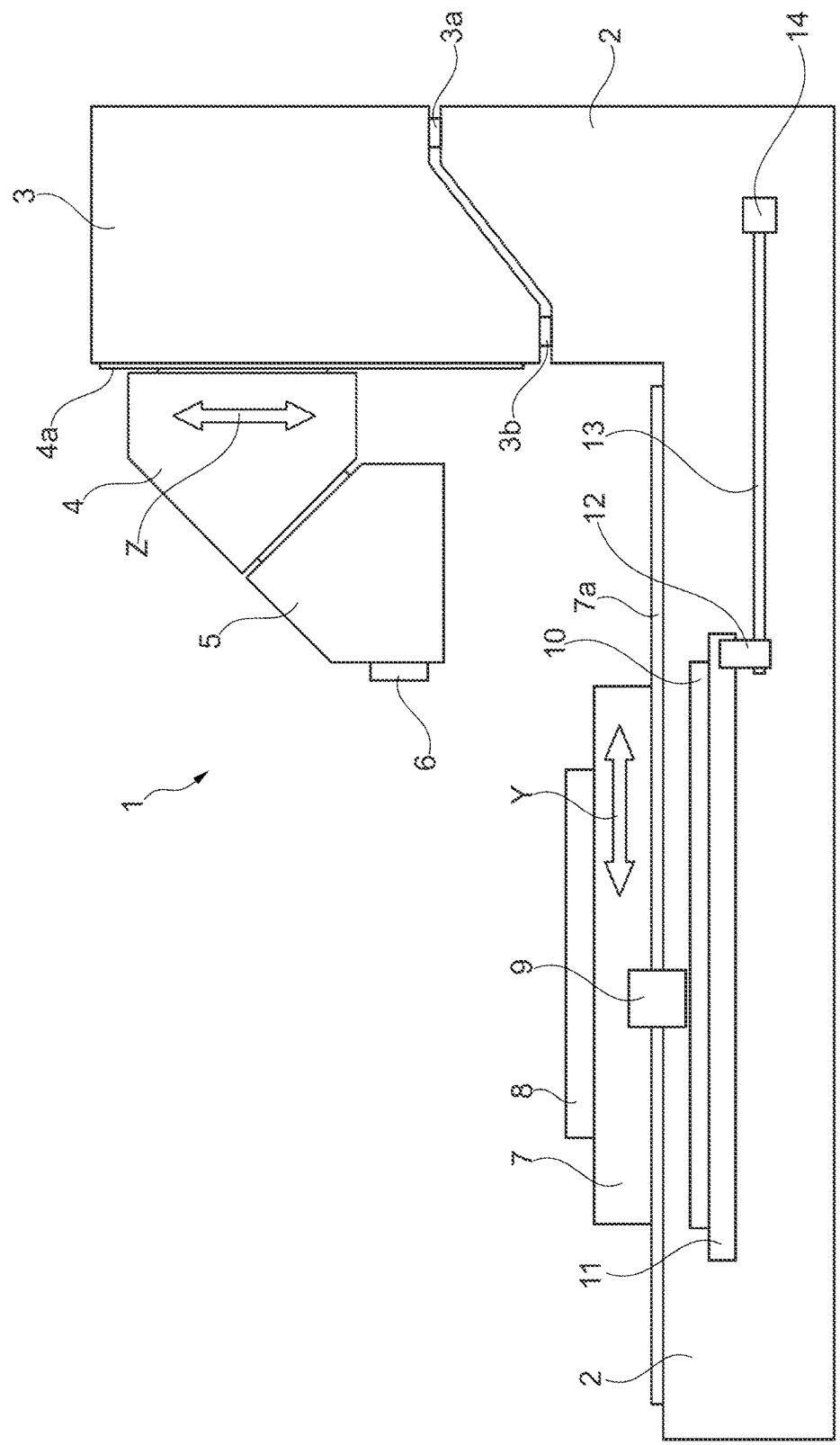
FIG. 2 shows an exemplary schematic diagram of a machine tool having a position measuring device according to a further embodiment.

FIG. 2 shows an exemplary schematic diagram of a machine tool 1 having a position measuring device according to a further embodiment.

The difference between the embodiment according to FIG. 2 and the embodiment according to FIGS. 1A and 1B is that in FIG. 2 the fixed point section 12, by way of which one end of the holding element 13 is attached in stationary fashion to the holding element 12, is not attached to the central section of the holding element 12 but to an end section of the holding element 12.

In the case of materials for the holding elements with very low expansion coefficient, the temperature properties and/or enabled temperature-independent position measuring accuracies of the embodiment according to FIG. 2 are as good as those of the embodiment according to FIGS. 1A and 1B. If the holding element 11 is made of a material which still has a thermal expansion coefficient that cannot be ignored, the embodiment according to FIGS. 1A and 1B is more useful since possible small expansions on both sides of the centrally arranged fixed point element 12 in FIGS. 1A and 1B are usually averaged out on average.

Figure 3:
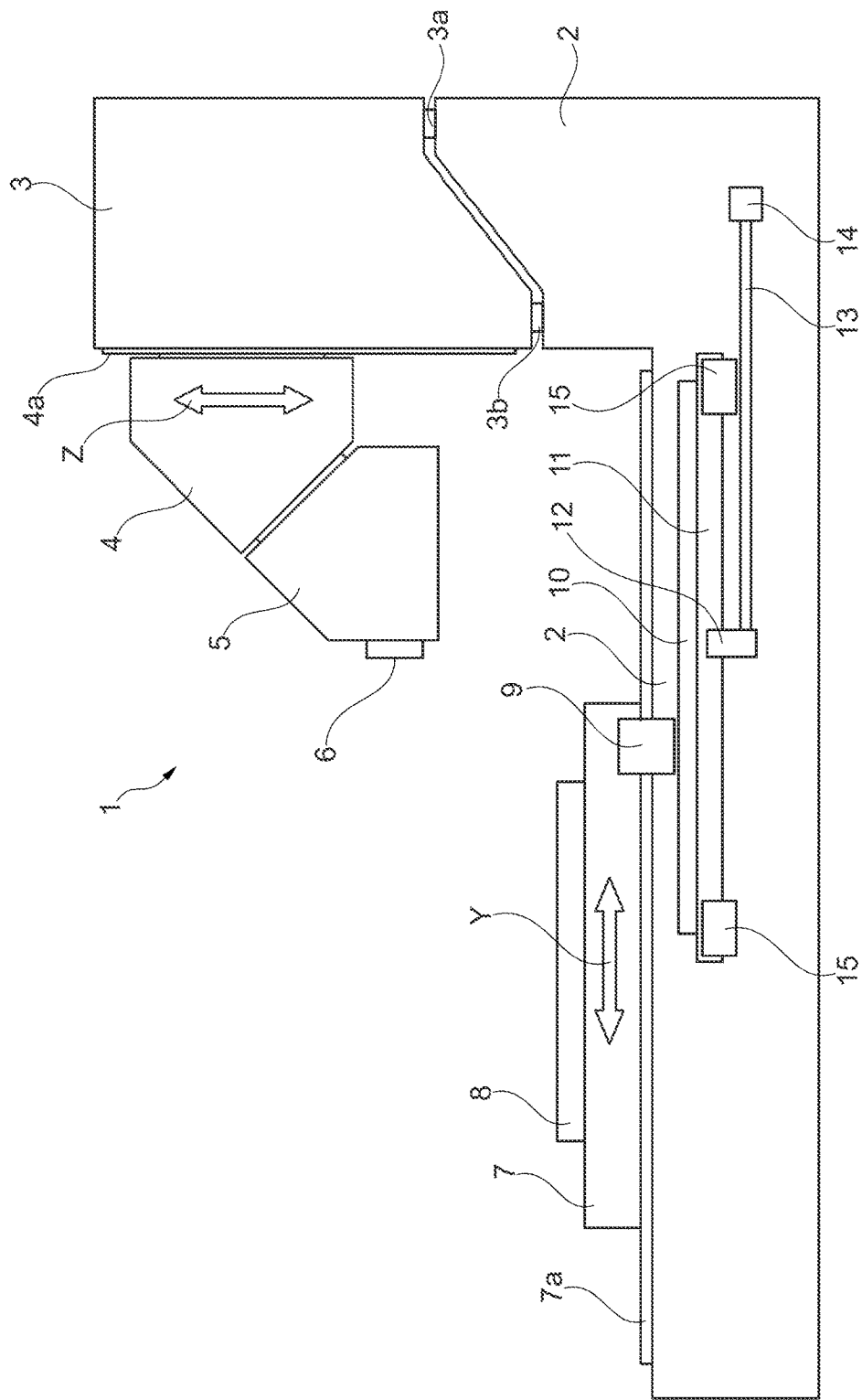
FIG. 3 shows an exemplary schematic diagram of a machine tool having a position measuring device according to a further embodiment.

FIG. 3 shows an exemplary schematic diagram of a machine tool 1 having a position measuring device according to a further embodiment.

The difference between the embodiment according to FIG. 3 and the embodiment according to FIGS. 1A and 1B is that in FIG. 3 additional supporting elements 15 are arranged on ends of the holding element 11, said supporting elements holding, forcing on, pressing on, clamping and/or supporting the holding element 11.

The holding element 11 and/or the scale section 10 can be held and/or mounted on the machine bed 2 by way of the supporting elements 15 in the sense that the scale section 10 and/or the holding element 11 are clamped, pressed, forced and/or held on the machine bed 2 but are not attached in fully stationary fashion so as to still render possible a thermal expansion of the machine bed 2 below and/or next to the scale section 10 without a position displacement and/or deformation of the machine bed 2.

Figure 4:
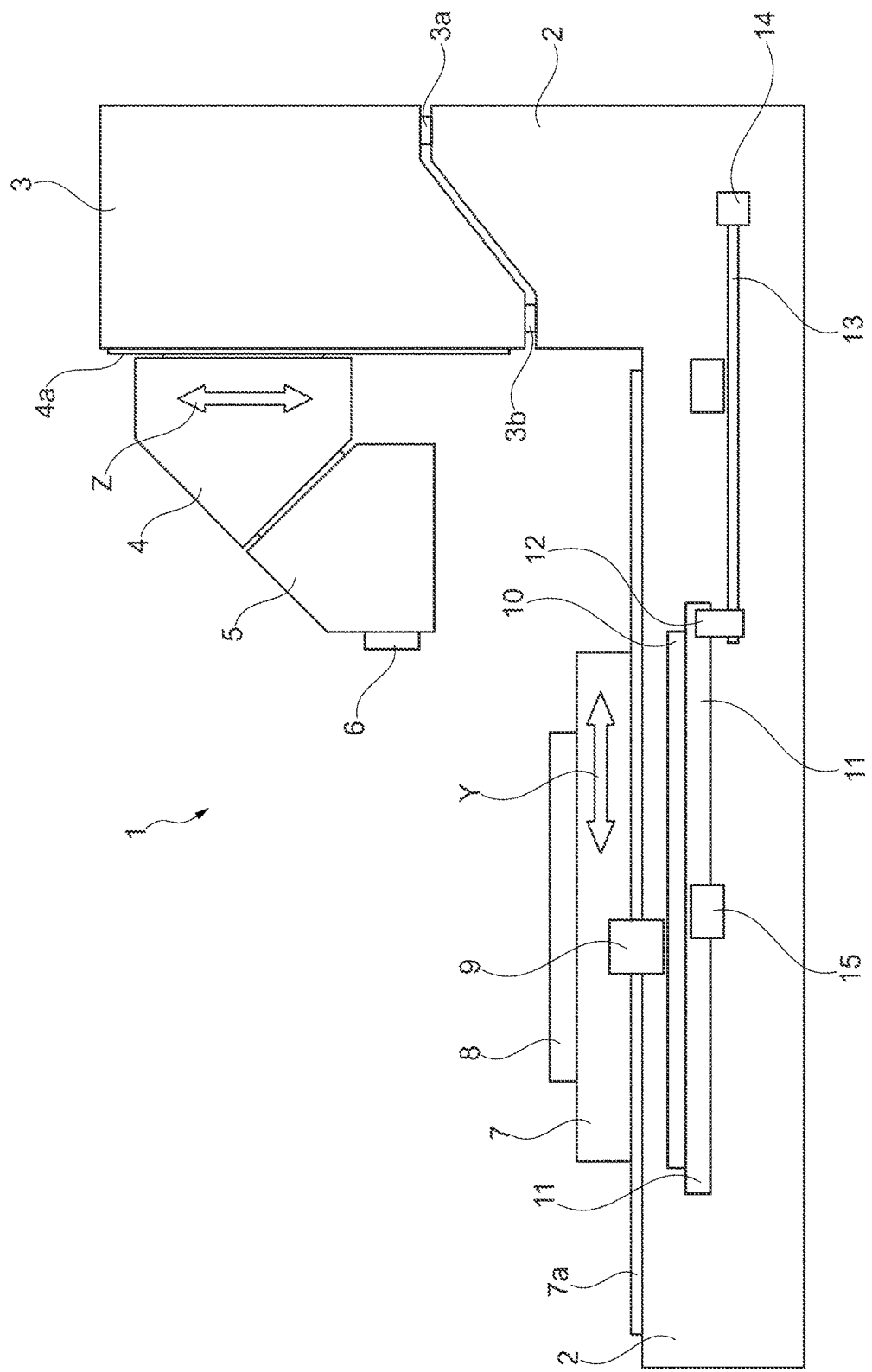
FIG. 4 shows an exemplary schematic diagram of a machine tool having a position measuring device according to a further embodiment.

FIG. 4 shows an exemplary schematic diagram of a machine tool 1 having a position measuring device according to a further embodiment.

The difference between the embodiment according to FIG. 4 and the embodiment according to FIG. 2 is that in FIG. 4 an additional supporting element 15 is arranged on a central section of the holding element 11, which holds, forces on, presses on, clamps and/or supports the holding element 11.

The holding element 11 and/or the scale section 10 can be held and/or mounted on the machine bed 2 by way of the supporting element 15 in the sense that the scale section 10 and/or the holding element 11 are clamped, pressed on, forced on and/or held on the machine bed 2 but are not attached in a completely stationary fashion so as to still render possible a thermal expansion of the machine bed 2 below and/or next to the scale section 10 without a position displacement and/or deformation of the machine bed 2.

Figure 5:
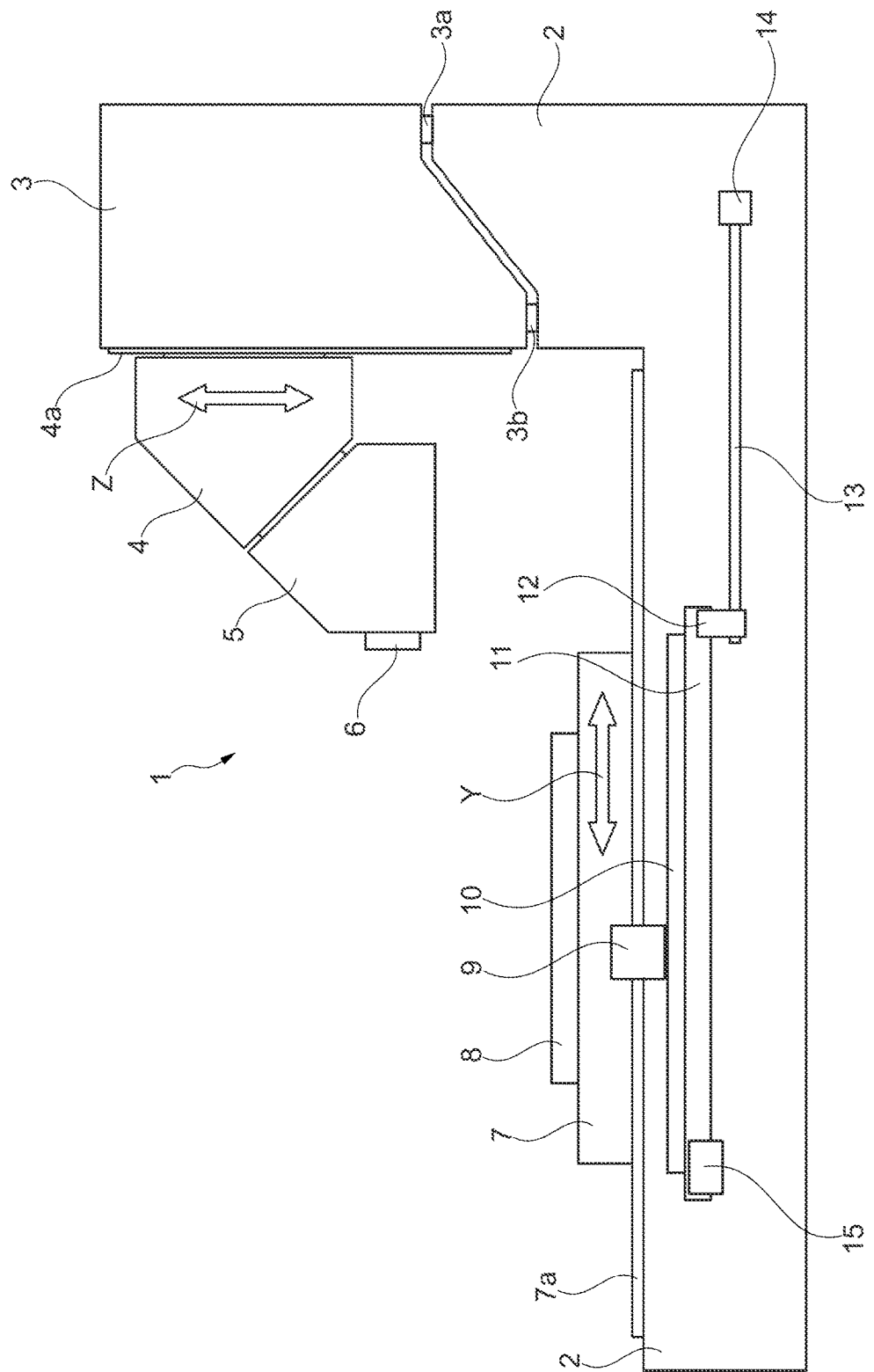
FIG. 5 shows an exemplary schematic diagram of a machine tool having a position measuring device according to a further embodiment.

FIG. 5 shows an exemplary schematic diagram of a machine tool 1 having a position measuring device according to a further embodiment.

The difference between the embodiment according to FIG. 5 and the embodiment according to FIG. 2 is that in FIG. 5 an additional supporting element 15 is arranged on the end section of the holding element 11, which is located opposite the fixed point section 12 attached to the holding element 11, the supporting element 15 holding, forcing on, pressing on, clamping and/or supporting the holding element 11.

The holding element 11 and/or the scale section 10 can be held and/or mounted on the machine bed 2 by way of the supporting element 15 in the sense that the scale section 10 and/or the holding element 11 are clamped, pressed on, forced on and/or held on the machine bed 2 but are not attached in completely stationary fashion so as to still render possible a thermal expansion of the machine bed 2 below and/or next to the scale section 10 without a position displacement and/or deformation of the machine bed 2.

Figure 6:
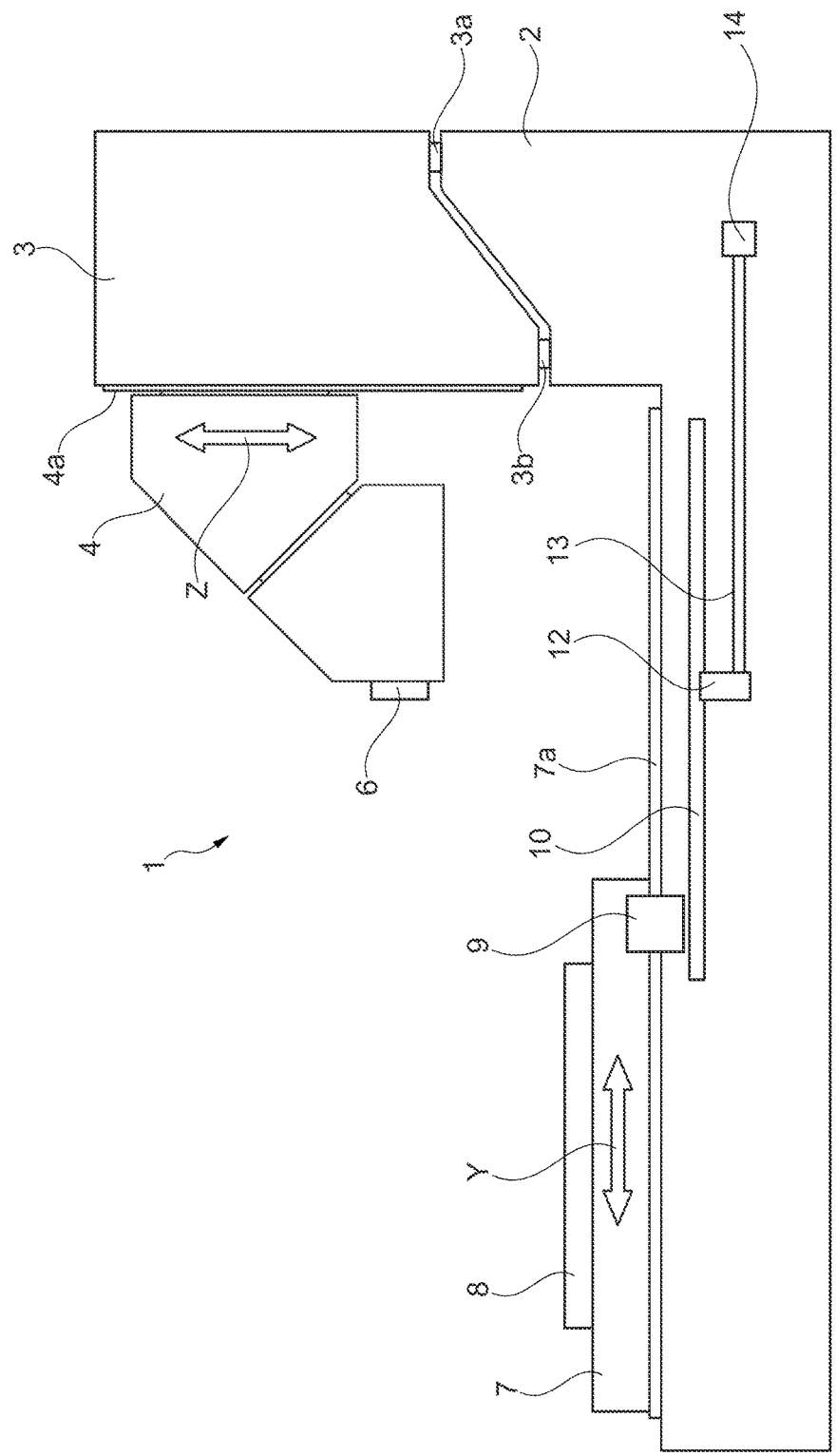
FIG. 6 shows an exemplary schematic diagram of a machine tool having a position measuring device according to a further embodiment.

FIG. 6 shows an exemplary schematic diagram of a machine tool 1 having a position measuring device according to a further embodiment.

This is here a simplified embodiment compared to FIGS. 1A and 1B. The difference between the embodiment according to FIG. 6 and the embodiment according to FIGS. 1A and 1B is that in FIG. 6 the holding element 11 is omitted by way of example and the fixed point section 12 attached to one end of the holding element 13 is directly attached, e.g., in stationary fashion to the scale section 10 of the position measuring device.

Figure 7:
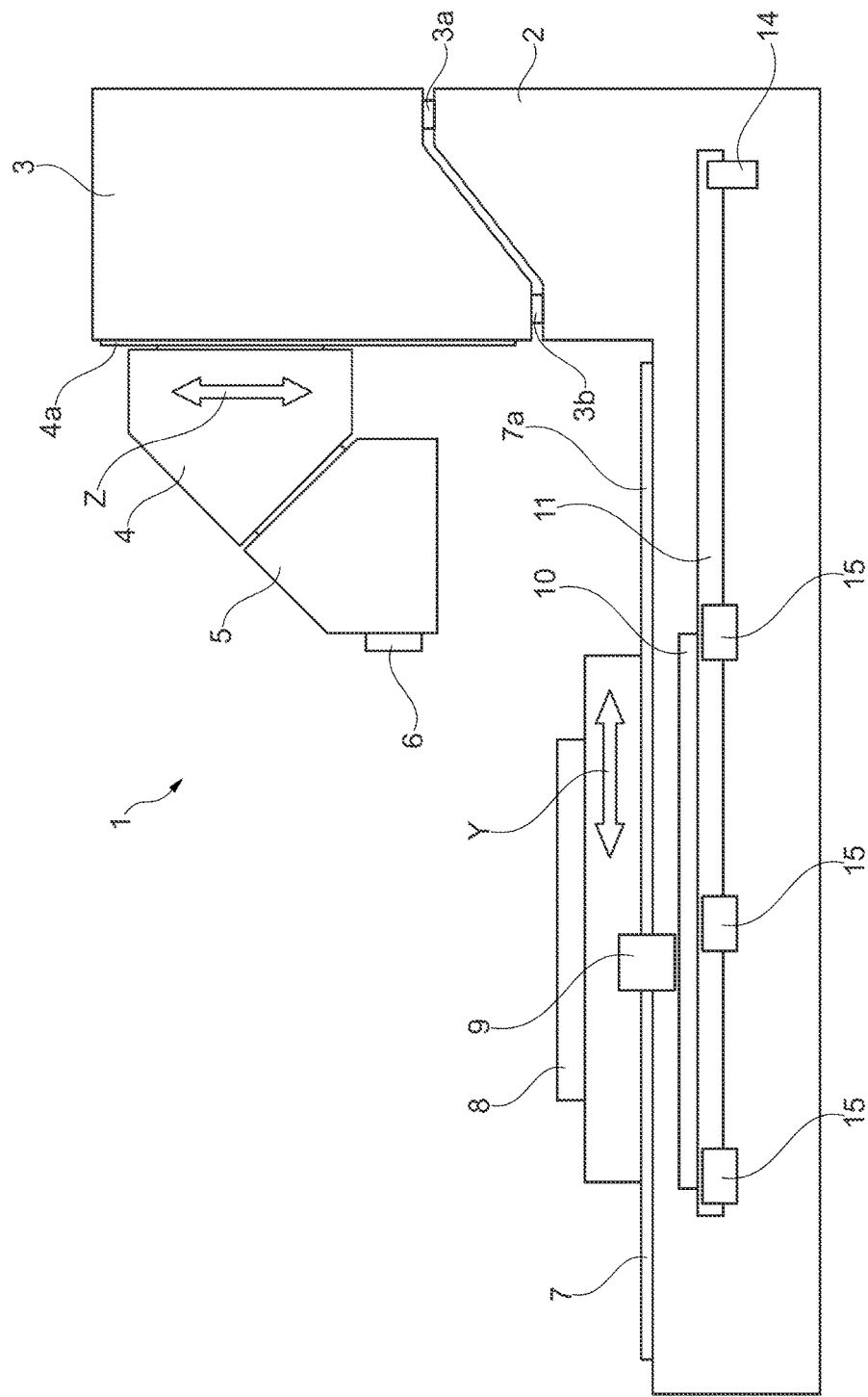
FIG. 7 shows an exemplary schematic diagram of a machine tool having a position measuring device according to a further embodiment.

FIG. 7 shows an exemplary schematic diagram of a machine tool 1 having a position measuring device according to a further embodiment.

The difference between the embodiment according to FIG. 7 and the embodiment according to FIGS. 1A and 1B is that in FIG. 7 the holding element 13 is omitted by way of example and one end of the holding element 11 is directly attached in stationary fashion to the fixed point section 14, via which the holding element 11 is attached, e.g., in stationary fashion to the machine bed 2.

Furthermore, a plurality of additional supporting elements 15 are arranged on the holding element 11 by way of example, the supporting elements 15 holding, forcing on, pressing on, clamping and/or supporting the holding element 11.

The holding element 11 and/or the scale section 10 can be held and/or mounted on the machine bed 2 by way of the supporting elements 15 in the sense that the scale section 10 and/or the holding element 11 are clamped, pressed on, forced on and/or held on the machine bed 2 but are not attached in a fully stationary fashion so as to still render possible a thermal expansion of the machine bed 2 below and/or next to the scale section 10 without a position displacement and/or deformation of the machine bed 2.

Figure 8:
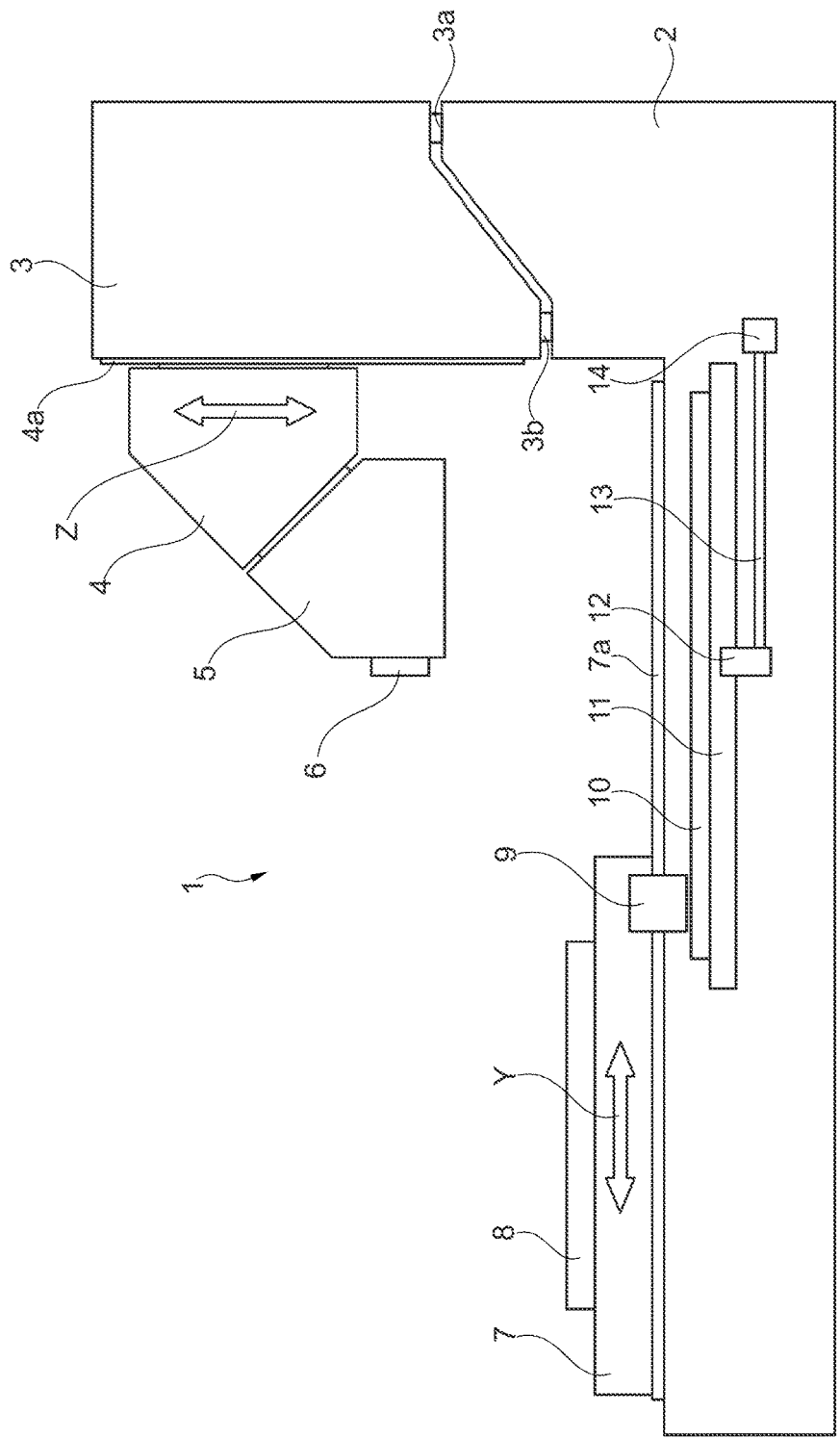
FIG. 8 shows an exemplary schematic diagram of a machine tool having a position measuring device according to a further embodiment.

FIG. 8 shows an exemplary schematic diagram of a machine tool 1 having a position measuring device according to a further embodiment.

The difference between the embodiment according to FIG. 8 and the embodiment according to FIGS. 1A and 1B is that in FIG. 8 the fixed point section 14, via which one end of the holding element 13 is attached in stationary fashion to the machine bed 2, is substantially arranged at a position which is positioned substantially at or near a plane generated by the other linear axes X and Z.

An advantage is that the temperature-independent fixed point of the attachment suspension of the position measuring device to the fixed point section 14 is substantially arranged on a coordinate zero point of the axis to be measured in relation to other axes.

Figure 9A:
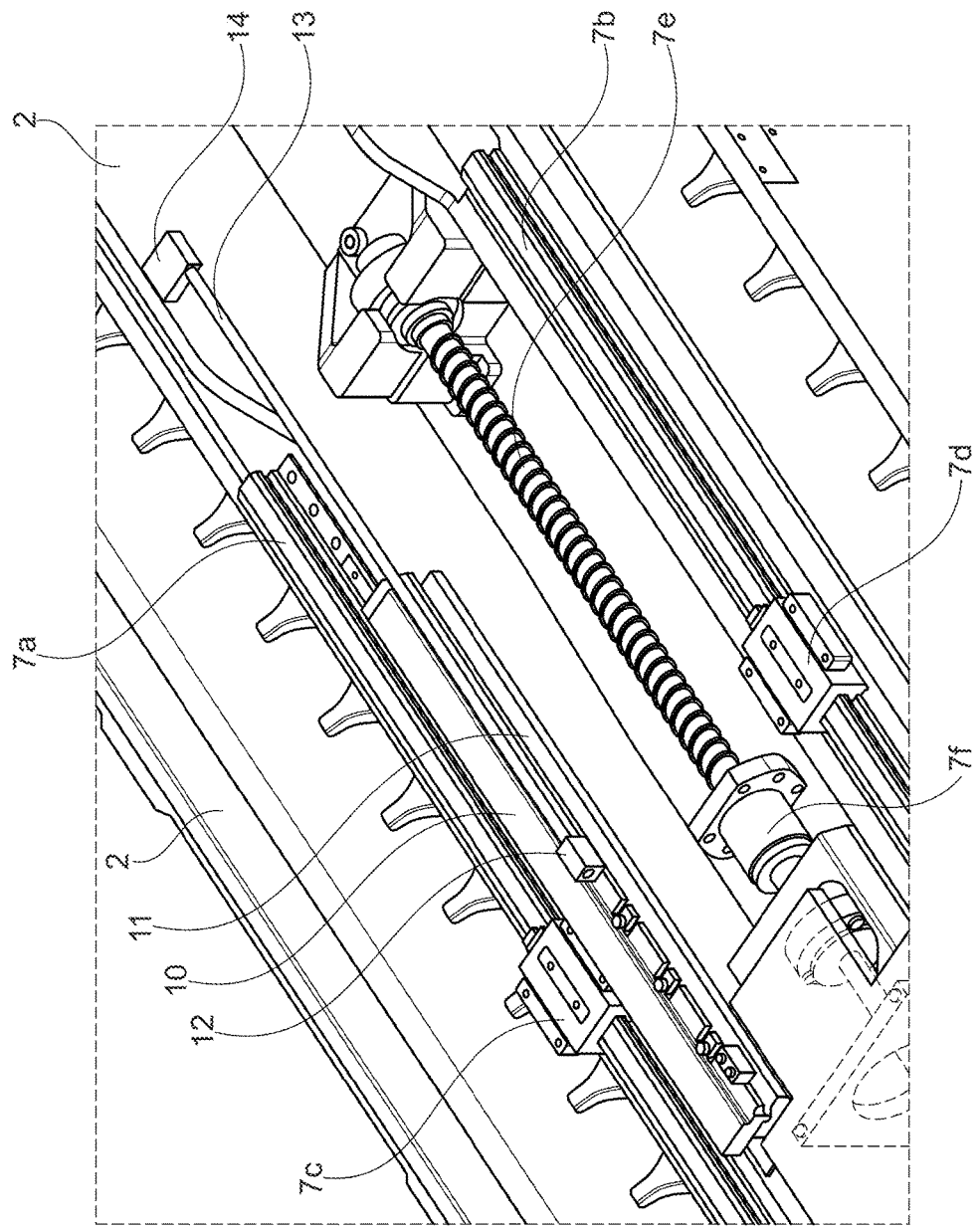
FIGS. 9A and 9B show exemplary schematic perspective views of details of a machine tool having a position measuring device according to a further embodiment.
Figure 9B:
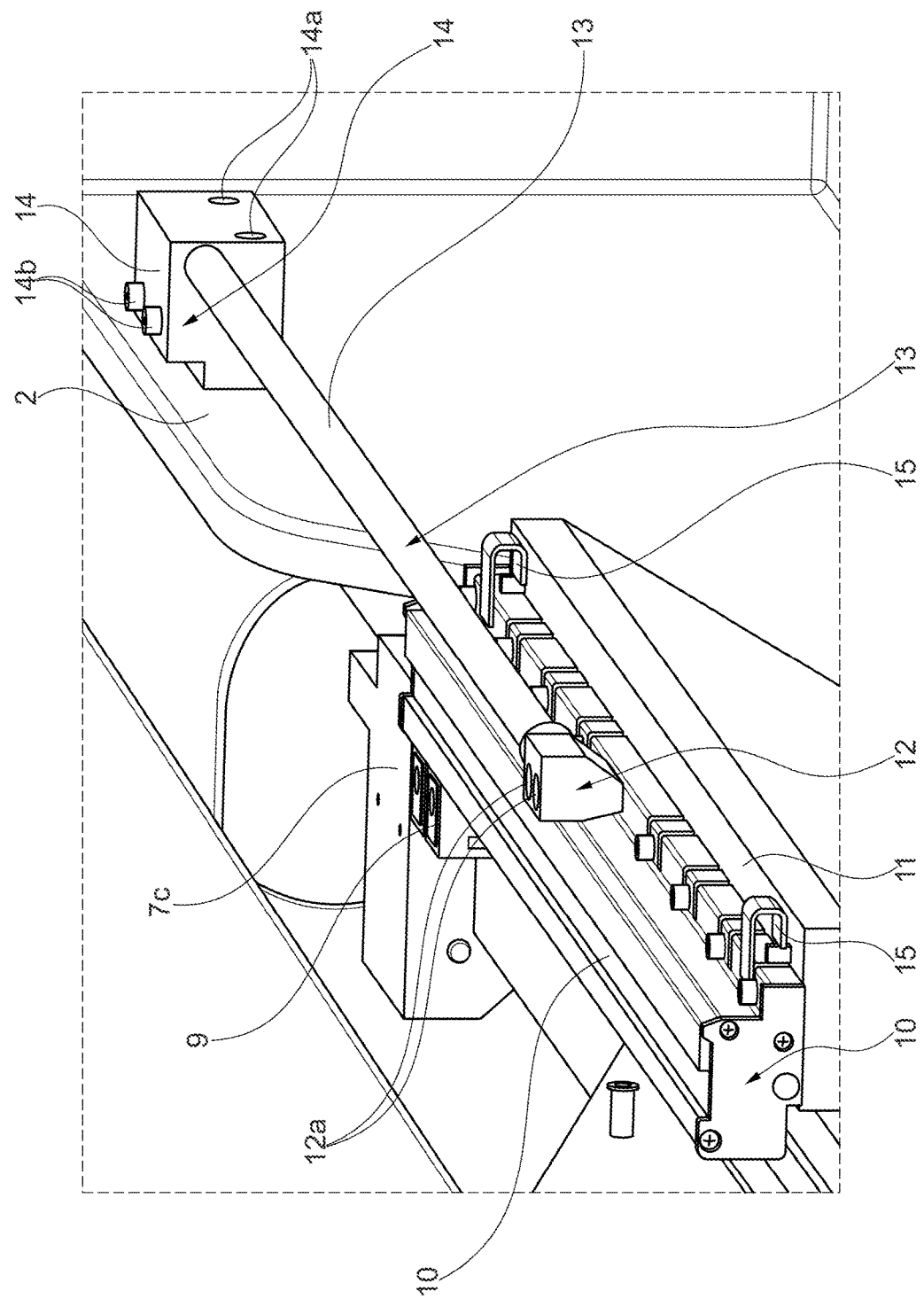

FIGS. 9A and 9B show exemplary schematic perspective views of details of a machine tool 1 having position measuring device according to a further embodiment. Guide rails and/or guideways 7a and 7b are arranged in a Y-direction on a machine bed 2 (first component) of a machine tool and are designed to move a slide (not shown) attached to the guide elements and/or guide slides 7c and 7d and/or machine table (second component) on the guide rails and/or guideways 7a and 7b in the Y-direction. The slide and/or machine table (second component) can be driven by way of a drive 7f, which is supported on a driveshaft 7e.

A scanner device 9 of the position measuring device is mounted on the guide element and/or guide slide 7c and also moves and/or travels with the guide element and/or guide slide 7c when the slide is moved. A scale section 10 of the position measuring device that is aligned in the Y-direction is arranged on the machine bed 2, the scanner device 9 being designed to optically, electronically, opto-electronically and/or magnetically scan the scale section 10 in order to determine the location and/or position of the slide and/or of the guide element and/or guide slide 7c in relation to the machine bed 2.

At an inner section of the machine bed 2 that is close to the machine stand, a fixed point attachment element 14 (fixed point section) is attached in stationary fashion to the machine bed 2, e.g., by way of screws 14a. One end of the holding rod 13 (holding element) is fixed in stationary fashion on the fixed point attachment element 14 (fixed point section), e.g., by way of screws 14b. The holding rod has a thermal expansion coefficient which is less than the thermal expansion coefficient of the material of the machine bed 2.

What is concerned here is preferably a holding rod made of a fiber-reinforced plastic material and/or in particular of a carbon fiber-reinforced plastic material or preferably a holding rod made of quartz glass.

A further fixed point attachment element 12 (fixed point section) is attached in stationary fashion on the other end of the holding rod 13, the fixed point attachment element 12 being attached in stationary fashion to the scale section 10.

The scale section 10 rests on a holding element 11 arranged on the machine bed 2 and is held on the machine bed 2 via supporting elements 15 (but it is not attached in stationary fashion, as a result of which the machine bed which is optionally deformed thermally can move away below the scale section 10).

The holding element 11 is preferably an elongate element made of a fiber-reinforced plastic material and/or in particular of a carbon fiber-reinforced plastic material, e.g., an elongate plate made of a fiber-reinforced plastic material and/or in particular of a carbon fiber-reinforced plastic material.

In summary, the present disclosure proposes aspects and embodiments which render possible in an advantageous way to provide a position and/or length measuring device for use on a machine tool and/or a machine tool which can further improve the processing accuracy and the calibration possibilities on the machine tool, in particular by way of simple, reliable and cost-effective measures.

The various embodiments described above can be combined to provide further embodiments. Aspects of the embodiments can be modified if necessary, and changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A position measuring device for use on a machine tool, comprising:
a scale section having a scale that is scannable by way of a scanner device and serves to detect a position of a first component of the machine tool in relation to a second component of the machine tool that is movable in relation to the first component when the scale section is arranged on the first component and the scanner device is arranged on the second component, and
at least one holding element that extends in a direction of the scale of the scale section and as a constituent of an indirect attachment indirectly attaches the scale section to a fixed point section of the first component of the machine tool,
wherein a material of the at least one holding element has a thermal expansion coefficient that is less than a thermal expansion coefficient of a material of the first component of the machine tool, and
wherein the at least one holding element is attachable at one end in the direction of the scale to the scale section and at the other end in the direction of the scale to the fixed point section of the first component, so that the position of the scale section relative to the fixed point section of the first component remains substantially unchanged in case of a thermal expansion of the first component.

2. The position measuring device according to claim 1, wherein the material of the at least one holding element has, in the direction of the scale section, a thermal expansion coefficient that is less than the thermal expansion coefficient of the material of the first component of the machine tool.

3. The position measuring device according to claim 1, wherein the material of the at least one holding element has a thermal expansion coefficient of less than or equal to $3.0 \cdot 10^{-6}$ $K^{-1}$.

4. The position measuring device according to claim 1, wherein the at least one holding element is made of a fiber-reinforced plastic material.

5. The position measuring device according to claim 1, wherein the at least one holding element is made of quartz glass.

6. The position measuring device according to claim 1, wherein the scale section is indirectly attachable via only one fixed point section that is attachable to the first component.

7. The position measuring device according to claim 1, wherein:
the scale section is directly or indirectly attached to the at least one holding element.

8. The position measuring device according to claim 7, wherein:
the at least one holding element is directly attached to the fixed point section that is mountable on the first component.

9. The position measuring device according to claim 8, wherein:
the at least one holding element is a rod that extends in the direction of the scale of the scale section and is made of quartz glass or of a fiber-reinforced plastic material, and
one end of the rod is attached to the fixed point section that is mountable on the first component and the other end of the rod is attached to the scale section via a second fixed point section.

10. The position measuring device according to claim 7, wherein:
the at least one holding element extends in the direction of the scale of the scale section and the scale section is attached to the at least one holding element, and
the at least one holding element is indirectly attached to the first component.

11. The position measuring device according to claim 10, wherein the at least one holding element is a first holding element and is attached to a second holding element, and the second holding element is attached to the fixed point section that is mountable on the first component.

12. The position measuring device according to claim 11, wherein the second holding element extends in the direction of the scale of the scale section and is attached to the scale section and/or the first holding element via only one fixed point section mounted on the scale section and/or the first holding element.

13. The position measuring device according to claim 12, wherein:
the second holding element is a rod which extends in the direction of the scale of the scale section and is made of quartz glass or of a fiber-reinforced plastic material, and
one end of the rod is attached to the fixed point section that is mountable on the first component, and the other end of the rod is attached to the first holding element via a second fixed point section.

14. The position measuring device according to claim 1, wherein the scale section and/or the at least one holding element is mountable on the first component via one or more supporting elements.

15. The position measuring device according to claim 1, wherein the position measuring device additionally includes the scanner device that is mountable on the second component and serves to scan the scale section in order to detect the position of the first component of the machine tool in relation to the second component of the machine tool, which is movable in relation to the first component.

16. A machine tool, comprising:
   a first component,
   a second component that is movable in relation to the first component, and
   a position measuring device according to claim 1.

17. The position measuring device according to claim 1, wherein the material of the at least one holding element has a thermal expansion coefficient of less than or equal to $1.0 \cdot 10^{-6}$ $K^{-1}$.

18. The position measuring device according to claim 1, wherein the at least one holding element is made of a carbon fiber-reinforced plastic material.

19. The position measuring device according to claim 9, wherein the at least one holding element is made of a carbon fiber-reinforced plastic material.

20. The position measuring device according to claim 13, wherein the second holding element is made of a carbon fiber-reinforced plastic material.

* * * * *